March 17, 1931.  R. W. CLIFFORD  1,796,561
TRUCK FOR RAILROAD VEHICLES
Filed Oct. 9, 1929   2 Sheets-Sheet 1
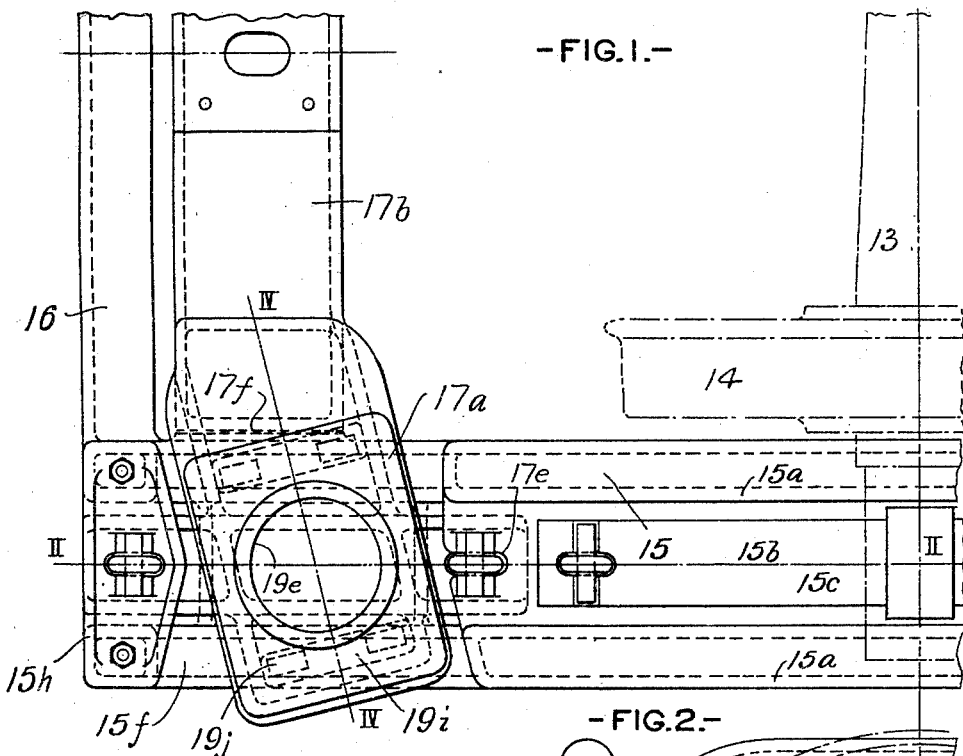
INVENTOR
Roger W. Clifford
BY S. C. Yeator
ATTORNEY March 17, 1931. R. W. CLIFFORD 1,796,561
TRUCK FOR RAILROAD VEHICLES
Filed Oct. 9, 1929 2 Sheets-Sheet 2
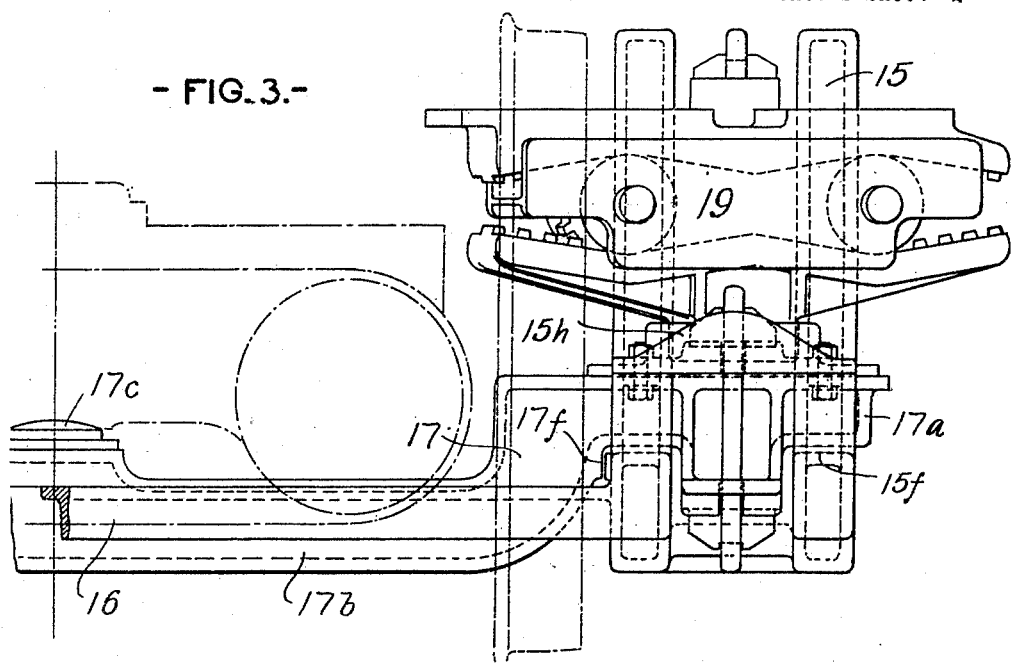
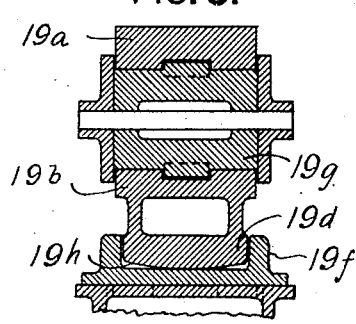
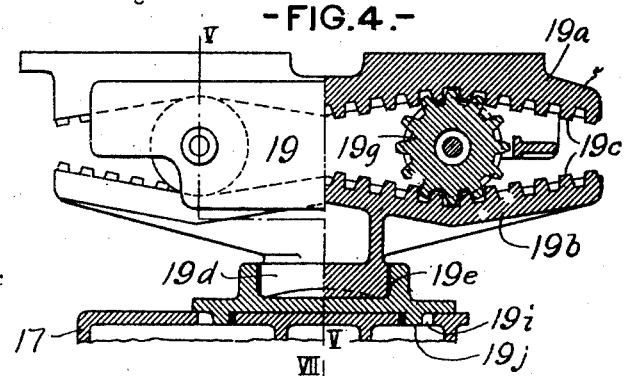
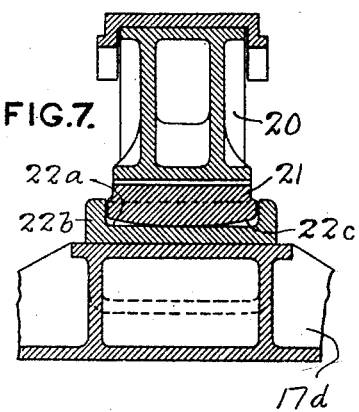
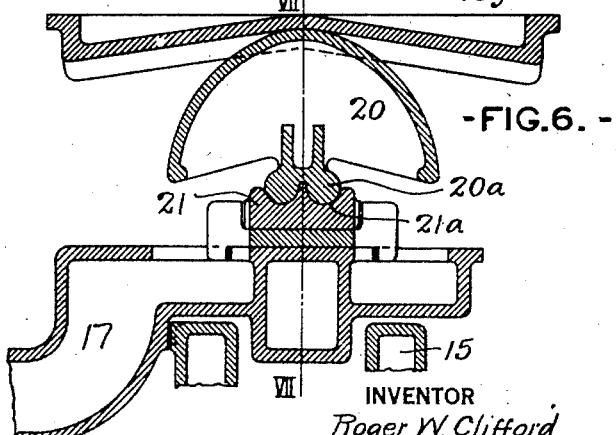
INVENTOR
Roger W. Clifford
BY S. C. Yeaton
ATTORNEY Patented Mar. 17, 1931

1,796,561

UNITED STATES PATENT OFFICE

ROGER W. CLIFFORD, OF SCHENECTADY, NEW YORK

TRUCK FOR RAILROAD VEHICLES

Application filed October 9, 1929. Serial No. 398,288.

This invention relates to trucks for railroad vehicles, and more particularly to trucks having lateral motion devices which support a portion of the weight of the locomotive.

In locomotive practice, the weight of the rear end of the locomotive is usually transmitted to the trailing truck through lateral motion devices, having their lower seats mounted on the truck and their upper seats connected to the locomotive frame, suitable rollers or rockers being interposed between the two seats. It has been found, with the constructions heretofore known, that, when the locomotive is traversing curved track, the upper and the lower roller seats are disaligned by the relative lateral, longitudinal, and rotative movements between the truck frame and the locomotive frame, which disalignment results in undesirable wear of the lateral motion devices, and consequent material shortening of their lives.

An object of the present invention is to provide a novel construction of truck frame and lateral motion devices, adapted to maintain proper alignment between the upper and lower seats of the lateral motion device irrespective of the relative lateral, longitudinal, or rotative movements between the truck frame and the locomotive frame which occur when the locomotive is traversing curved track, whereby the life of the lateral motion devices is materially prolonged.

Another object of the present invention is to provide a truck having a rigid frame and a bolster for supporting lateral motion devices, the bolster being adapted to reinforce the frame and capable of movement relatively to the frame so as to obviate undesirable relative longitudinal movements between the upper and lower seats of the devices when the truck is traversing curved track.

A further object of the invention is to provide a truck of the type indicated, wherein the bolster is adapted to support a booster motor.

Other objects of the invention will hereinafter readily appear.

The improvement claimed is hereinafter fully set forth.

In the accompanying drawings: Figure 1, is a plan view of the right hand side of the rear end of a truck embodying the invention the lateral motion device being removed; Fig. 2, a vertical, longitudinal section taken on the line II—II of Fig. 1; Fig. 3, a rear end elevation, of the construction shown in Fig. 1 one of the lateral motion devices being shown applied; Fig. 4, a view, one half in part elevation and one half in vertical section, taken on the line IV—IV of Fig. 1, showing details of a lateral motion device and its application to the truck bolster; Fig. 5, a vertical section, taken on the line V—V of Fig. 4; Fig. 6, a vertical, longitudinal section similar to Fig. 4, showing a modified form of construction; Fig. 7, a vertical transverse section taken on the line VII—VII of Fig. 6; and, Fig. 8, a plan view of the lower rocker seat of the modified lateral motion device shown in Figs. 6 and 7.

In the practice of the invention, referring descriptively to the specific embodiment thereof which has been selected for exemplification herein, the truck comprises a frame 10, having pedestal jaws, 11, which receive journal boxes 12 mounted on the axle 13, of wheels 14. The frame comprises two parallel side members 15, each embodying a pair of parallel vertical side walls 15a spaced apart to provide a vertical recess 15b for the reception of springs 15c, spring hangers 15d, and bolster hangers 15e. The side members 15 are rigidly connected together at their rear ends by a cross-tie member 16.

To provide for supporting lateral motion devices and a booster motor on the truck, a transverse box beam bolster 17, is suspended on the side members. This bolster comprises two box shape hollow ends 17a, and a depressed intermediate portion 17b connecting the ends and having a central bearing seat 17c for supporting a booster motor. The box shape ends 17a of the bolster are suspended in recesses or pockets 15f formed in the side members between the crosstie 16 and the rear pedestal jaw 11, by hangers 15e. To provide for suspending the bolster on the side members, its box shape ends are provided on each side with a lateral flange or bracket 17d, adapted to project beyond the side walls of the pocket 15f into the recess 15b between the side walls 15a of the side members. Each flange is provided with a slot 17e adapted to receive the lower end of a hanger. The upper ends of the hangers 15e are supported on gib seats, 15g, formed on the side members 15. Each box shape end of the bolster is formed with a longitudinal guide shoulder 17f, adapted to contact with a finished longitudinal face on the inner wall of each side frame member, whereby transverse alignment of the bolster with the side members is maintained irrespective of the longitudinal traverse of the bolster.

The side walls of each side frame member are joined together at their tops to the rear of the pocket, by a transverse member 15h, and at their bottoms directly beneath the pocket, by a transverse member 15j. Preferably the frame is formed as an integral or one piece casting, but it is within the contemplation of the invention to fabricate it of separate parts.

Each lateral motion device 19, comprises an upper bearing seat 19a and a lower bearing seat 19b, each seat having a rack 19c. The lower roller seat is formed at its bottom with a trunnion 19d which fits in a pocket 19e of the base 19f. Interposed between the seats and meshing with the racks, are geared rollers 19g. The bottom end of the trunnion 19d has a curved face 19h to adapt the trunnion to rock as well as rotate. The base 19f, is mounted on the top wall of the end of the bolster, suitable slots 19i being provided in that wall for the reception of lugs 19j formed on the base. Sufficient play is provided between the lugs and the edges of the slots to enable proper adjustment of the base. After the desired adjustment has been effected the base may be rigidly fixed to the bolster by welding or any other suitable means. It is within the contemplation of the invention to employ instead of the geared roller lateral motion devices any other suitable type of lateral motion device.

In Figures 6, 7 and 8, is shown a modified form of construction wherein rockers 20 are used instead of rollers. Each rocker 20 is formed at its bottom with two lobe shape cam members 20a which are fitted in complementally shaped grooves 21a provided in a seat block 21. The blocks 21 are mounted for partial rotation in sockets 22a formed in bases 22b, and have their bottom bearing faces 22c curved in one direction as shown in Fig. 7, to compensate for longitudinal tilting movements of the truck frame.

The described constructions enable the bolster to move longitudinally of the side frame members in a vertical arcuate path in the nature of a swinging cradle, and the lower roller seats to rotate on the trunnions, whereby the proper relation between the upper and lower roller seats is maintained, irrespective of the relative lateral, longitudinal, and rotative displacements which occur between the truck frame and the locomotive frame when the locomotive is traversing curved track.

While one of the preferred forms of construction has been described and shown, it is obvious that many variations in procedure, and in the form, arrangement, and construction of parts, may be resorted to, and the invention, therefore, is not limited to the particular embodiment disclosed, but includes such changes and modifications as come within the spirit and scope of the invention as set forth in the appended claims.

The invention claimed and desired to be secured by Letters Patent, is:

1. In a locomotive truck, the combination of a pair of side frame members, a pedestal jaw for each of the members, and a cross member disposed at one side of the jaws and supported at each end on the side frame members entirely at said side with the capacity of traverse longitudinally thereof.

2. A locomotive truck comprising a pair of side frame members, a pedestal jaw for each of the members, and a bolster disposed at one side of the jaws and supported on the side frame members entirely at said side with the capacity of traverse longitudinally thereof.

3. In a truck for locomotives, the combination of a frame, a pedestal jaw for each side of the frame, and means disposed at one side of the jaws and supported on the frame entirely at said side and adapted to support a lateral motion device, said means being capable of traverse longitudinally of the frame in a vertical arcuate path.

4. In a truck for locomotives, the combination of a frame, a pedestal jaw for each side of the frame, and a lateral motion device disposed at one side of the jaws and supported on the frame entirely at said side and with the capacity of traverse as a unit longitudinally thereof.

5. In a truck for locomotives, the combination of a frame, a pedestal jaw for each side of the frame, a lateral motion device lower bearing seat disposed at one side of the jaws, and means mounting said lower bearing seat on the frame for support thereby entirely at said side and with the capacity of traverse longitudinally thereof.

6. In a truck for locomotives, the combination of a frame comprising a pair of side frame members, a pedestal jaw for each of the members, a bolster disposed at one side of the jaws and supported on the side frame members entirely at said side and with the capacity of traverse longitudinally thereof, and a lateral motion device mounted on said bolster.

7. A locomotive truck comprising a pair of side frame members, a pedestal jaw for each of the members, a bolster disposed at one side of the jaws and supported by the side frame members entirely at said side and with the capacity of traverse longitudinally thereof, and links suspending the bolster from the side frame members.

8. In a truck for locomotives, the combination of a frame comprising a pair of side frame members, a pedestal jaw for each of the members, a bolster disposed at one side of the jaws and supported by the side frame members entirely at said side and with the capacity of traverse longitudinally thereof, links suspending the bolster from the side frame members, and a lateral motion device mounted on said bolster.

9. In a locomotive truck, the combination of a pair of side frame members, a pedestal jaw for each of the members, and a bolster disposed at one side of the jaws suspended from the frame entirely at said side and capable of movement longitudinally thereof in a vertical arcuate path.

10. A locomotive truck, comprising a pair of side frame members, a pedestal jaw for each of the members, a crosstie connecting the members, a bolster disposed at one side of the jaws, and means suspending the bolster from the side frame members entirely at said side and with the capacity of traverse longitudinally thereof in a vertical arcuate path.

11. A locomotive truck comprising a pair of side frame members, a bolster having end portions each formed with a seat for a lateral motion device and an intermediate portion adapted to support a booster motor, and hangers suspending the bolster from the side frame members.

12. A locomotive truck comprising a pair of side frame members each provided with a recess, a pedestal jaw for each of the members, a bolster disposed at one side of the jaws and having its ends fitted in the recesses, and hangers suspending the bolster from the side frame members entirely at said side.

13. A locomotive truck comprising a pair of side frame members each provided with a recess, a pedestal jaw for each of the members, a bolster disposed at one side of the jaws and having its ends fitted in the recesses and adapted to swing therein longitudinally of the side frame members, and hangers suspending the bolster from the side frame members entirely at said side.

14. A locomotive truck comprising a pair of side frame members each having a transverse recess and a longitudinal recess, a bolster having at each end a portion disposed in the transverse recess and a portion disposed in the longitudinal recess, and hangers suspending the bolster from the side frame members.

15. A locomotive truck comprising a pair of side frame members each having a transverse recess and a longitudinal recess opening into the transverse recess, a bolster having at each end a portion disposed in the transverse recess and a lateral extension disposed in the longitudinal recess, and hangers suspending the bolster from the side frame members.

16. A locomotive truck comprising a pair of side frame members each having a pair of vertical side walls spaced to provide a longitudinal recess, at least one of the walls having a transverse recess opening into the longitudinal recess, a bolster having at each end a portion disposed in the transverse recess and a portion disposed in the longitudinal recess, and hangers suspending the bolster from the side frame members.

17. A locomotive truck comprising a pair of side frame members each having a transverse recess, and a longitudinal recess on each side of the transverse recess and opening thereinto, a bolster having at each end a portion disposed in the transverse recess with the capacity of movement therein longitudinally of the side frame members, and an extension projecting from each side of each end portion and disposed in one of the longitudinal recesses, and hangers suspending the bolster from the side frame members.

18. In a truck for locomotives, the combination of a pair of side frame members, a bolster carried by the side frame members with the capacity of swinging longitudinally thereof, and a lateral motion device rotatably mounted on the bolster.

19. In a truck for locomotives, the combination of a pair of side frame members, a bolster carried by the side frame members with the capacity of swinging longitudinally thereof, a lateral motion device, and means for rotatably supporting the lateral motion device on the bolster, said means comprising a trunnion element and a socket element.

20. A truck for locomotives comprising a pair of side frame members, and a bolster mounted on the side frame members with the capacity of movement longitudinally thereof, said bolster being adapted to support a booster motor and the portion of the weight of a locomotive imposed on the side frame members.

21. A locomotive truck comprising a pair of side frame members, a pedestal jaw for each of the members, a bolster disposed at one side of the jaws and supported by the side frame members entirely at said side with the capacity of traverse longitudinally thereof, said bolster having end portions adapted for a lateral motion device and an intermediate portion adapted to support a booster motor.

22. In a truck for locomotives, the combination of a pair of side frame members, a bolster carried by the side frame members with the capacity of moving longitudinally thereof, and a lateral motion device rotatably mounted on the bolster.

23. In a truck for locomotives, the combination of a pair of side frame members, and a bolster carried by the side frame members with the capacity of moving longitudinally thereof, a lateral motion device, and means for rotatably supporting the lateral motion device on the bolster, said means comprising a trunnion element and a socket element.

24. In a locomotive truck, the combination of a pair of side frame members, a bolster supported by the side frame members with the capacity of traverse longitudinally thereof, a lateral motion device, and means for supporting the lateral motion device on the bolster with the capacity for rocking relative to the bolster.

25. In a locomotive truck, the combination of a pair of side frame members, a bolster supported by the side frame members with the capacity of traverse longitudinally thereof, a lateral motion device, and means for supporting the lateral motion device on the bolster with the capacity for rocking and rotating relative to the bolster.

26. The combination of a locomotive frame; a truck comprising a pair of side frame members; a pedestal jaw for each of the members; a lateral motion device disposed at one side of the jaws, comprising an upper member and a lower member, disposed between the frames said members being free for relative movement in aligned opposite directions with the corresponding relative movement of their respective adjacent frames during lateral relative movement of the frames, and means restricting the members to said aligned oppositely directed movement; and means entirely at said side flexibly connecting the device between the said frames permitting other relative movements of the frames during running of the locomotive independent of any relative movement of the members.

ROGER W. CLIFFORD.